US012710076B2

(12) United States Patent
Spahr et al.

(10) Patent No.: US 12,710,076 B2
(45) Date of Patent: Aug. 18, 2026

(54) HUB, IN PARTICULAR FOR BICYCLES

(71) Applicant: DT SWISS INC., Grand Junction, CO (US)

(72) Inventors: Stefan Spahr, Lengnau (CH); Nicholas Omlin, Rapperswil (CH)

(73) Assignee: DT SWISS INC., Grand Junction, CO (US)

( * ) Notice: Subject to any disclaimer, the term of this patent is extended or adjusted under 35 U.S.C. 154(b) by 394 days.

(21) Appl. No.: 18/503,382

(22) Filed: Nov. 7, 2023

(65) Prior Publication Data

US 2024/0149615 A1 May 9, 2024

(30) Foreign Application Priority Data

Nov. 8, 2022 (DE) ..................... 10 2022 129 455.2

(51) Int. Cl.
*F16D 41/36* (2006.01)
*B60B 27/02* (2006.01)
(Continued)

(52) U.S. Cl.
CPC ............ *F16D 41/36* (2013.01); *B60B 27/023* (2013.01); *B60B 27/047* (2013.01); *F16D 41/32* (2013.01)

(58) Field of Classification Search
CPC .......... F16D 41/24; F16D 41/36; F16D 41/32; F16D 41/185; F16D 41/18; B60B 27/023; B60B 27/047; B60B 27/0031
See application file for complete search history.

(56) References Cited

U.S. PATENT DOCUMENTS

| | | | |
|---|---|---|---|
| 6,588,564 | B1 | 7/2003 | Jaeger et al. |
| 8,936,144 | B2 | 1/2015 | Spahr et al. |

(Continued)

FOREIGN PATENT DOCUMENTS

| | | | |
|---|---|---|---|
| DE | 102007026821 | A1 | 12/2008 |
| DE | 102007063895 | B3 | 12/2016 |

(Continued)

OTHER PUBLICATIONS

German Search Report received for Application No. 10 2022 129 562.1 dated Aug. 9, 2023.

(Continued)

*Primary Examiner* — Timothy Hannon
(74) *Attorney, Agent, or Firm* — Greer, Burns & Crain, Ltd

(57) ABSTRACT

A bicycle hub with an axle, a shell, a rotor with a rotor body and a freewheel device with, a hub-side toothed disk device coupled to the hub shell, and a rotor-side toothed disk device interacting therewith and coupled to the rotor body, to drivingly couple the rotor to the hub shell in the driving direction and decouple from one another when freewheeling. The toothed disk devices include an end toothing and are biased to an engagement position. A sprocket accommodation is on the rotor body which includes on the hub-side end an inner radial wall to support a hub-side rotor bearing. On an end face at the hub-side end of the rotor, radially between the inner radial wall and an rotor outer wall, a circumferential accommodation accessible from the end face is configured, so the rotor-side toothed disk device is accommodated in a fixed driving manner and axially movable.

19 Claims, 5 Drawing Sheets

(51) Int. Cl.
*B60B 27/04* (2006.01)
*F16D 41/32* (2006.01)

(56) References Cited

U.S. PATENT DOCUMENTS

| | | | |
|---|---|---|---|
| 10,442,245 B2 | 10/2019 | Walthert | |
| 11,220,133 B2 | 1/2022 | Walthert et al. | |
| 11,400,754 B2 | 8/2022 | Spahr et al. | |
| 2012/0285785 A1* | 11/2012 | Tho | F16D 27/01 192/64 |
| 2021/0155038 A1* | 5/2021 | Miles | B60B 27/023 |

FOREIGN PATENT DOCUMENTS

| | | |
|---|---|---|
| DE | 102015009041 A1 | 1/2017 |
| DE | 102016010853 A1 | 4/2017 |
| DE | 102016115515 A1 | 2/2018 |
| DE | 102018101725 A1 | 7/2019 |
| DE | 102020103129 A1 | 8/2021 |
| EP | 2221192 A1 | 8/2010 |
| EP | 3118019 A1 | 1/2017 |
| EP | 3517315 A1 | 7/2019 |

OTHER PUBLICATIONS

European Search Report received for Application No. 23207437.7 dated May 3, 2024.

* cited by examiner 44
2a
68
70
60a
47
65
63
60
46
67
47a
70a
40
56
66a
11c
69
60b
61
19
62
43
30
34
36
13
15
20
24
18
6
16
8
8c
8
3
3b
30d
53
20d
4b
4
8b
8b

HUB, IN PARTICULAR FOR BICYCLES

BACKGROUND

The present invention relates to a hub for vehicles and, in particular, bicycles, which in normal and regular proper use are at least partially muscle-powered, the hub comprising a hub shell, a rotor, a freewheel device and a hub axle. The hub shell and the rotor are supported for rotation with at least two roller bearings each. In the rotor and the hub shell the freewheel device is provided to connect the rotor with the hub shell, non-rotatable in the driving direction. While the user is not applying any driving force or while back-pedalling, the freewheel device enables a freewheeling state, in which the hub can continue rotating, while the rotor remains for example motionless.

Other than in bicycles, the hub may be used in other partially muscle-powered vehicles and two-wheeled vehicles, which are for example provided with an electric auxiliary drive. The hub is, in particular, used in sports bicycles. In all the configurations, the hub according to the invention is employed in vehicles and, in particular, bicycles which in normal and regular proper use are at least partially muscle-powered.

The prior art has disclosed various hubs comprising a freewheel, so that the pedal crank will not keep rotating along for example during a downhill ride. Thus, the prior art has disclosed hubs with ratchet freewheels where the pawls can radially pivot between a freewheel position and an engagement position. Suitable examples of such a hub are disclosed in commonly-owned U.S. Pat. Nos. 6,588,564 and 11,220,133, the contents of which are incorporated by reference herein. These hubs are provided with different numbers of ratchet pawls and tend to show four ratchet pawls symmetrically distributed over the circumference. As force is transmitted, the ratchet pawls engage a toothing in the rotor. The relatively low number of ratchet pawls results in a relatively large angle of rotation before rotational force is transmitted when pedalling is resumed.

EP 1 121 255 B1 has disclosed a hub with a toothed disk freewheel which reliably and very quickly transmits the driving force from the rotor to the hub shell. Friction loss is relatively low while the user is not actuating the pedals. The hub provides for reliable function, enabling applying even loads on the teeth of the toothed disks. To this end, this hub employs two toothed disks, each of which is axially movable, and which are axially urged toward one another from the outside, by way of a spring each. The two toothed disks are thus floatingly supported and for example in case of the hub flexing or other types of stresses, they may be oriented to one another to provide a particularly reliable operation.

EP 3 275 692 A1 (U.S. Pat. No. 10,442,245, incorporated by reference herein) to the applicant has disclosed a further development of such a lightweight hub with a toothed disk freewheel and a reliable function. In the hub, the toothed disk freewheel comprises a rotor-side freewheel component and a hub-side freewheel component, wherein the hub-side freewheel component is screwed into the hub shell, forming a bearing seat for a roller bearing accommodated therein for supporting the hub shell. Thus, the rigidity of the hub can be increased.

To still further increase the stability, DE 10 2020 103 129 A1 (U.S. Pat. No. 11,400,754, incorporated by reference herein) to the applicant has disclosed a hub with such a toothed disk freewheel, wherein the hub bearing disposed on the rotor side for supporting the hub shell is disposed in an area of the hub axle having an enlarged diameter. Thus, the stability can be increased, since the larger wall thickness of the hub axle can be selected considerably larger in the area of the hub bearing facing the rotor.

DE 10 2015 009 041 A1 has disclosed a hub in which a type of toothed disk freewheel is provided by means of coupling rings. The subject matter is, to provide a free fit design between the hub axle and the inner ring of a bearing, for ease of installation. Furthermore, a noise reduction member is employed to absorb the characteristic noises of a toothed disk freewheel. An attachment member in the hub axle interior spreads the hub axle in the area of a bearing, to provide a safe seat and ease of installation. The structure is complicated, due to the many different components.

It is therefore the object of the present invention to provide a lightweight hub, which enables a simple structure, high stability, and a very reliable function.

SUMMARY

A hub according to the invention is provided for at least partially muscle-powered vehicles and, in particular, bicycles, and comprises a hub axle which is, in particular, hollow, a hub shell, a rotor with a rotor body, and a freewheel device with two toothed disk devices. One of the toothed disk devices is configured as a hub-side toothed disk device and is coupled to the hub shell. The other of the toothed disk devices is configured as a rotor-side toothed disk device coupled to the rotor body, and interacts with the hub-side toothed disk device to couple the rotor to the hub shell in a rotationally fixed manner in the driving direction, and to decouple them from one another in a freewheeling position. The toothed disk devices each comprise an end toothing for engaging with one another, and they are biased by means of at least one biasing device to an engagement position. At least one sprocket accommodation for at least one sprocket device is configured on the outside of the rotor body. On the hub-side end, the rotor body comprises an inner radial wall to radially support a (hub-side) rotor bearing. On an end face at the hub-side end of the rotor, a circumferential accommodation, which is accessible from the end face is configured radially between the inner radial wall and an outer wall of the rotor, in which the rotor-side toothed disk device is accommodated in a rotationally fixed manner in the driving direction and axially movable.

The hub according to the invention has many advantages. A considerable advantage of the hub according to the invention consists in that a compact structure is achieved, having an encapsulated structure, and allowing a wide support for the rotor. Due to providing respectively accommodating a hub-side rotor bearing on an inner radial wall at the hub-side end of the rotor body, a particularly wide support for the rotor can be achieved. Due to the accommodation in the rotor body accessible from the hub-side end face, in which the rotor-side toothed disk device is received, simple and reliable sealing of the freewheel device can be achieved, while on the other hand, the rotor-side toothed disk device is axially movable and axially guided on the rotor.

In a preferred specific embodiment, the hub-side toothed disk device is accommodated radially within the hub shell, and the end toothing is oriented to the rotor. The rotor-side toothed disk device is, in particular, accommodated radially within the rotor, and the end toothing is oriented to the hub shell.

Particularly preferably, at least half the axial width of the rotor-side toothed disk device is accommodated radially within the hub shell. This means that the rotor-side toothed disk device is immediately surrounded by parts of the rotor in the radial direction, which rotor is in turn at least partially radially surrounded by the hub shell in the area of the rotor-side toothed disk device. In other words, there exists a plane of cross section of the rotor-side toothed disk device transverse to the axis of symmetry (axis line), which intersects the rotor with the rotor-side toothed disk device and the hub shell as well. This provides a compact structure.

Preferably, the hub-side toothed disk device and the rotor-side toothed disk device are each coupled to the hub shell respectively the rotor on the radial outside, in a rotationally fixed manner in the driving direction. The rotor-side toothed disk device, in particular, comprises an outer radial toothing, which is in engagement with an inner radial toothing in the rotor. The rotor-side toothed disk device is axially movable relative to the rotor and is axially guided by the intermeshing, inner radial toothing and the outer radial toothing. This means that the rotor-side toothed disk device is movable relative to the rotor to at least two different axial positions. The different axial positions may also differ in the peripheral direction, for example when the outer radial toothing is configured as a helical toothing.

Particularly preferably, the hub-side toothed disk device also comprises an outer radial toothing in engagement with an inner radial toothing in the hub shell. Preferably, the hub-side toothed disk device is correspondingly axially movable relative to the hub shell. Again, a helical toothing is conceivable.

In preferred specific embodiments, the outer diameter of the sprocket accommodation is smaller than the outer diameter of the rotor-side toothed disk device and/or smaller than the outer diameter of the end toothing of the rotor-side toothed disk device. The sprocket accommodation accommodates on the rotor at least one sprocket or multiple sprockets or a sprocket cluster, and as a rule has a standardized external shape respectively a standardized outer diameter.

The fact that the outer diameter of the rotor-side toothed disk device is preferably larger than the outer diameter of the sprocket accommodation, provides a particularly safe support and a particularly reliable transmission of the driving torque. The large outer diameter of the end toothing of the rotor-side toothed disk device allows the placement of a plurality of teeth on the end toothing, such that the engagement angle is particularly small. This causes a direct response of the freewheel device. Only a small pedalling angle is required to achieve re-engagement.

In preferred specific embodiments, the inner radial toothing on the hub shell is configured on a threaded ring screwed into the hub shell. The threaded ring may be of the same material as the hub shell, or of a more lightweight, or a more stable material. For example the threaded ring may consist of steel or aluminum or titanium, or an alloy from those materials.

In preferred configurations, the threaded ring comprises on the axially outer surface (facing the rotor) a centric and, in particular, conical depression, into which a conical portion configured on the hub-side end face of the rotor plunges contactless. This provides a compact structure. Furthermore, a conical sealing portion may be configured between the conical depression and the conical portion.

Preferably, the threaded ring comprises on the axially inner surface facing away from the rotor a (conical) support portion, which rests against a correspondingly (conically) configured accommodating contour in the hub shell. In particular, the support portion is supported on the accommodating contour in the hub shell.

The threaded ring comprises an external thread which is screwed into an internal thread of the hub shell. The orientation is such that during pedalling in the driving direction, the threaded ring screws further into the hub shell, respectively transmits a corresponding rotational force. Such configuration provides that the threaded ring does not inadvertently detach.

In preferred configurations, the external thread of the threaded ring extends axially outwardly beyond the hub-side toothed disk device, and preferably extends radially beyond the rotor-side toothed disk device, which it overlaps at least partially (in the radial direction). This achieves a particularly compact structure. Moreover, the external thread on the threaded ring can be extended, so that the surface pressure is reduced.

In particularly preferred configurations, the external thread of the threaded ring comprises at least two separately configured, continuous thread grooves. Preferably, the internal thread in the hub shell comprises two separate, correspondingly configured and continuous thread grooves. Such a multiple thread allows on the whole, a higher stability under load, and a lower force in the axial direction acting on the hub shell due to the introduced rotational force.

Preferably, at least one toothed disk device and, in particular, at least the rotor-side and/or the hub-side toothed disk device, comprises an engagement body, on which the end toothing and the outer radial toothing are configured. Preferably, the engagement body has an axial extension which is larger than the axial width of a roller bearing. The axial extension is, in particular, larger than the axial width of the hub-side rotor bearing. Preferably, the axial extension of the engagement body is at least larger than half the axial width of the hub-side rotor bearing. This provides a considerable length of axial guidance of at least one toothed disk device.

Particularly preferably, the engagement body of at least one toothed disk device has an axial extension which is larger than the radial height of the end toothing on the engagement body. The axial extension is, in particular, at least 1.5 times larger than the radial height of the end toothing. The axial length of the outer radial toothing on the engagement body is, in particular, (at least 1.5 times) larger than the radial height of the end toothing. This allows a toothed disk device with a large clear inner diameter and a large contact surface of the toothed disk devices in the area of the end toothing, while at the same time providing reliable and reproducible guiding in the axial direction.

In particularly preferred configurations, the hub-side toothed disk device and the rotor-side toothed disk device are configured substantially the same, and particularly preferably, exactly the same. Identical configurations of the toothed disk devices facilitate installation, and reliably prevent errors in installation. Moreover, storage is simplified.

Particularly preferably, at least one biasing device is assigned to each of the two toothed disk devices, floatingly urging the toothed disk devices toward one another. Then, the freewheel device comprises two freewheel components, each comprising one toothed disk device and one (preferably identical) biasing device. In simple configurations, a toothed disk device is formed by the engagement body, on which both the outer radial toothing and the end toothing is configured.

Particularly preferably, the rotor with at least, and, in particular, exactly two axially spaced apart rotor bearings is supported for rotation relative to, and, in particular, on the hub axle. One of the rotor bearings is disposed closer to the hub shell, and may be referred to as a hub-side rotor bearing, and the other of the rotor bearings is further distant from the hub shell and may be referred to as an outer rotor bearing.

Preferably, the hub shell with at least, and, in particular, exactly two axially spaced apart hub bearings is supported for rotation relative to, and, in particular, on the hub axle. One of the hub bearings is disposed closer to the rotor, and may be referred to as a rotor-side hub bearing, and another hub bearing is further distant from the rotor, and may be referred to as an outer hub bearing. Then, the outer hub bearing and the outer rotor bearing are disposed on hub ends more distant from one another.

The rotor body has a hub-side end and an opposite, outer end. Preferably, the rotor body on the hub-side end has an end portion with an enlarged diameter, on which (and, in particular, in which) the rotor-side toothed disk device is accommodated. The end portion preferably extends from the hub-side end of the end portion respectively the hub-side end of the rotor to another, distant end.

Between the hub shell and the rotor, a sealing device is preferably configured, comprising between the hub shell and the rotor an axially inner (and, in particular, conical) sealing gap, and axially further outwardly, an outer sealing gap, and axially between, a sealing unit with a sealing lip. The axially inner sealing gap is, in particular, configured by a cone gap between the conical portion on the rotor and the conical depression in the threaded ring.

Particularly preferably, the conical portion has a clear gap width of less than 1.5 mm and preferably less than 1 mm.

In preferred configurations, the end portion of the rotor comprises on the outer periphery, a circumferential groove, in which the sealing unit is disposed. The sealing unit preferably comprises a circumferential ring portion in the groove and an elastic sealing lip protruding obliquely outwardly from the ring portion. In the mounted condition, the ring portion and the elastic sealing lip shows a V-shape open toward the axially outer end (of the rotor). The elastic sealing lip extends conically outwardly.

The conical portion is preferably configured on the hub-side end of the end portion of the rotor, and at the other end of the end portion, a further enlarged diameter area is configured on the end portion. A (radial) sealing gap is configured between the rotor and the hub shell, between the enlarged diameter area and a radially inwardly protruding sealing wall on the rotor-side end of the hub shell. The sealing gap preferably has a clear dimension of less than 1 mm or less than 0.5 mm.

Preferably, a radially circumferential sealing groove is configured in the hub shell adjacent to the sealing wall, into which the elastic sealing lip projects. In the case of water penetrating from the outside, the elastic sealing lip bears elastically (more forcefully) against the inner wall of the sealing groove. In the normal state, the elastic sealing lip may bear (slightly) contacting against the circumferential sealing groove.

The radially largest inner diameter (outermost point) of the sealing groove is preferably larger than what is the largest outer diameter (outermost point) of the elastic sealing lip in the normal state. The largest inner diameter of the sealing groove is preferably axially further outwardly than the largest outer diameter of the elastic sealing lip. What is the largest outer diameter (outermost point) in the normal state of the elastic sealing lip, is preferably larger than the diameter of the outer sealing gap between the hub shell and the rotor.

The rotor according to the invention is provided for a hub for at least partially muscle-powered vehicles and, in particular, bicycles, and comprises a rotor body extending from an inner, hub-side end toward an outer end (an end facing away from the hub shell). The rotor furthermore comprises a rotor-side toothed disk device coupled to the rotor body, to couple the rotor body to the hub shell in a rotationally fixed manner in the driving direction, and to decouple from the hub shell in a freewheeling position. The rotor-side toothed disk device comprises an end toothing for engagement in an end toothing coupled to the hub shell. The rotor-side toothed disk device is biased to an engagement position by means of at least one biasing device. At least one sprocket accommodation for at least one sprocket device is configured (outwardly) on the rotor body. On the hub-side end, the rotor body comprises an inner radial wall to radially support a hub-side rotor bearing. On an end face at the hub-side end of the rotor, a circumferential accommodation, which is accessible from the end face, is configured radially between the inner radial wall and the outer wall, in which the rotor-side toothed disk device is accommodated in a rotationally fixed manner in the driving direction and axially movable.

The rotor according to the invention has many advantages. The rotor according to the invention shows the considerable advantage that the rotor-side toothed disk device is accommodated protected within the accommodation. Furthermore, due to the hub-side rotor bearing being accommodated at the hub-side end of the rotor on an inner radial wall, an axially particularly wide support for the rotor is enabled. The rotor-side toothed disk device shows a large, inner clear diameter, so as to enable a high number of teeth on the end toothing. At the same time, a large force-transmitting area is provided.

In a preferred specific embodiment of the rotor, the rotor body comprises at least two rotor bearings, namely the hub-side rotor bearing and a farther distant, outer rotor bearing. At least one of the rotor bearings and, in particular, both of the rotor bearings is/are configured to support the rotor body (immediately) on a hub axle.

The rotor body, in particular, comprises on the hub-side end, an end portion with an enlarged diameter, on which, and, in particular, in which, the rotor-side toothed disk device is accommodated. On the inner periphery of the end portion, an inner radial toothing is configured (inner radial toothing). In the inner radial toothing the rotor-side toothed disk device is coupled in a rotationally fixed manner in the driving direction, to the outer radial toothing of the toothed disk device.

Preferably, the end portion comprises on the outer periphery, a circumferential groove with a sealing unit disposed therein, wherein the sealing unit comprises a circumferential ring portion in the groove and an elastic sealing lip protruding obliquely outwardly from the ring portion. In the mounted condition, the ring portion and the elastic sealing lip form a V-shape open toward the outer end of the rotor. The sealing unit is open conically outwardly. This enables a particularly reliable sealing.

The rotor body may, in particular, comprise at least two rotor parts, a first rotor part supporting the outwardly rotor bearing and a second rotor part supporting the hub-side rotor bearing. This allows flexibility in the configuration. Preferably, the second rotor part is screwed in, or screw-connected with, the first rotor part.

Preferably, a connecting area is configured on the first rotor part and a connecting portion, on the second rotor part, wherein the connecting area of the first rotor part is connected with a connecting portion of the second rotor part. The connecting portion has a threaded portion and a guiding portion, and the connecting area comprises a threaded area and a guiding area. The threaded area is screwed to the threaded portion and the guiding area is centered on the guiding portion. The radial tolerance between the first rotor part and the second rotor part on the threaded portion is higher than on the guiding portion. This construction provides a reliable, safe guiding of the two rotor parts relative to one another. For the rotor body it is particularly important to provide for an exact, concentric orientation. Such configuration is achieved by the interaction of the guiding area with the guiding portion.

Further advantages and features of the present invention can be taken from the exemplary embodiments which will be discussed below with reference to the enclosed figures.

DETAILED DESCRIPTION

Figure 1:
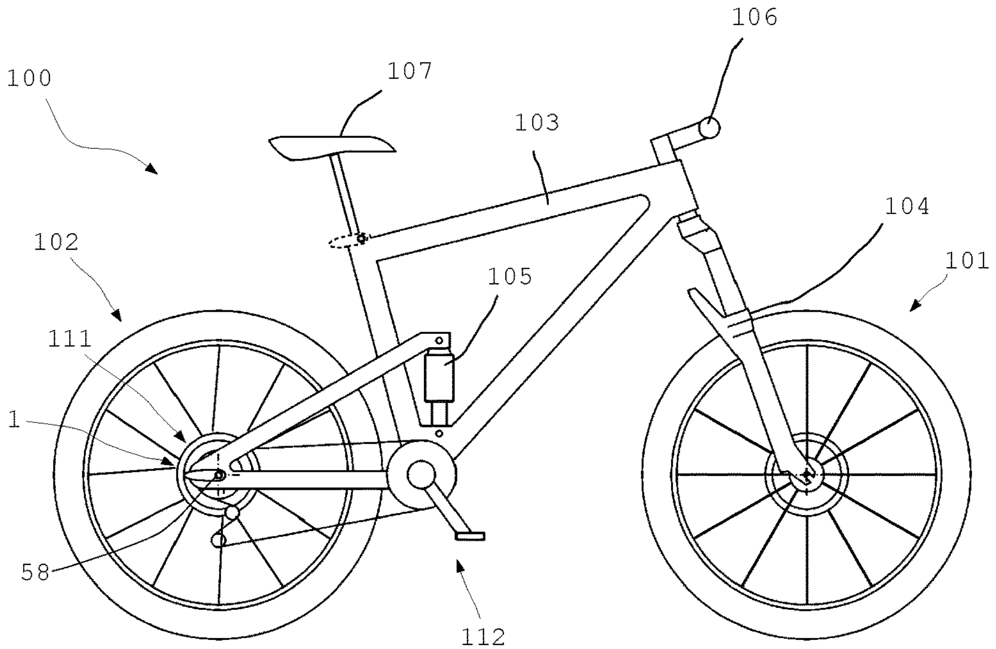
FIG. 1 a schematic illustration of a mountain bike.
Figure 2:
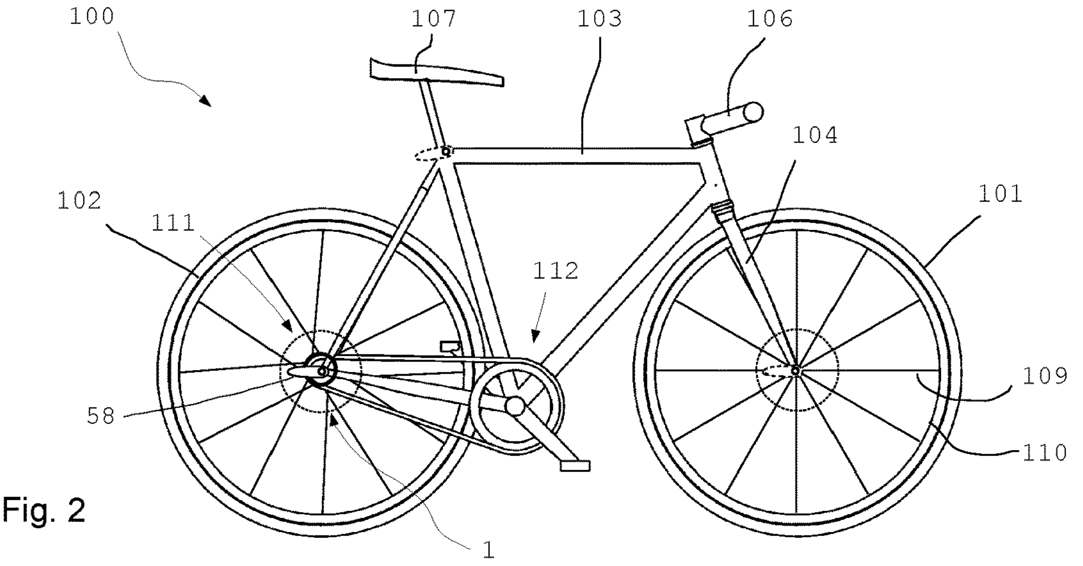
FIG. 2 a schematic illustration of a racing bicycle.

The FIGS. 1 and 2 illustrate a mountain bike respectively a racing bicycle 100 which are each equipped with a hub 1 according to the invention. The mountain bike or racing bicycle 100 is provided with a front wheel 101 and a rear wheel 102. The hub 1 according to the invention is used with the rear wheel 102. The two wheels 101, 102 comprise spokes 109 and a rim 110 and a sprocket assembly 111. Basically, conventional caliper brakes or other brakes such as for example disk brakes may be provided.

A bicycle 100 comprises a frame 103, a handlebar 106, a saddle 107, a fork or suspension fork 104 and in the case of the mountain bike, a rear wheel damper 105 may be provided. A pedal crank 112 with pedals serves for driving. Optionally the pedal crank 112 and/or the wheels may be provided with an electrical auxiliary drive. The hub 1 of the wheels may be attached to the frame by means of a clamping mechanism 58 (for example a through axle or quick release).

Figure 3:
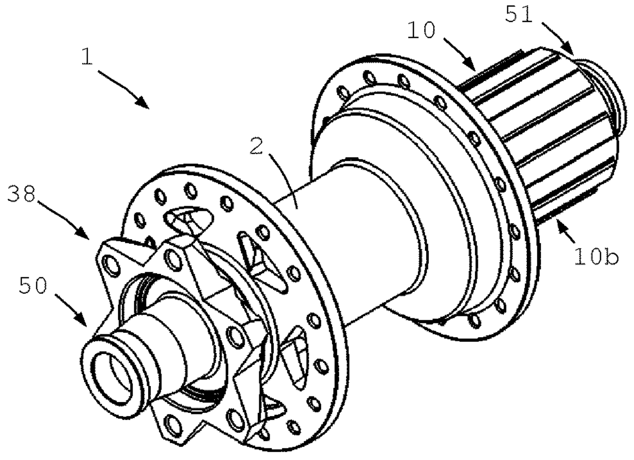
FIG. 3 a perspective illustration of a hub according to the application.
Figure 4:
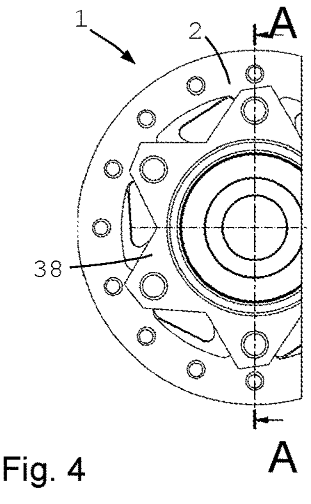
FIG. 4 a front view of the hub according to FIG. 3.

The hubs 1 inserted in the rear wheels 102 in the bicycles according to FIGS. 1 and 2 are shown in FIG. 3 in perspective, and in FIG. 4 in a front view.

The hub 1 comprises a hub shell 2 and a rotor 10, and a brake disk accommodation 38. The outer surface of the rotor 10 is provided with a sprocket accommodation 10*b* to accommodate a sprocket cluster having an appropriate quantity of sprockets. The two ends of the hub 1 are provided with limit stops 50, 51, presently shown pushed on, but they may optionally be pushed in or screw-fastened. As can be seen, the limit stops 50, 51 are configured hollow and serve to accommodate a clamping axle 59 with which to fasten the hub 1 to the frame.

Figure 5:
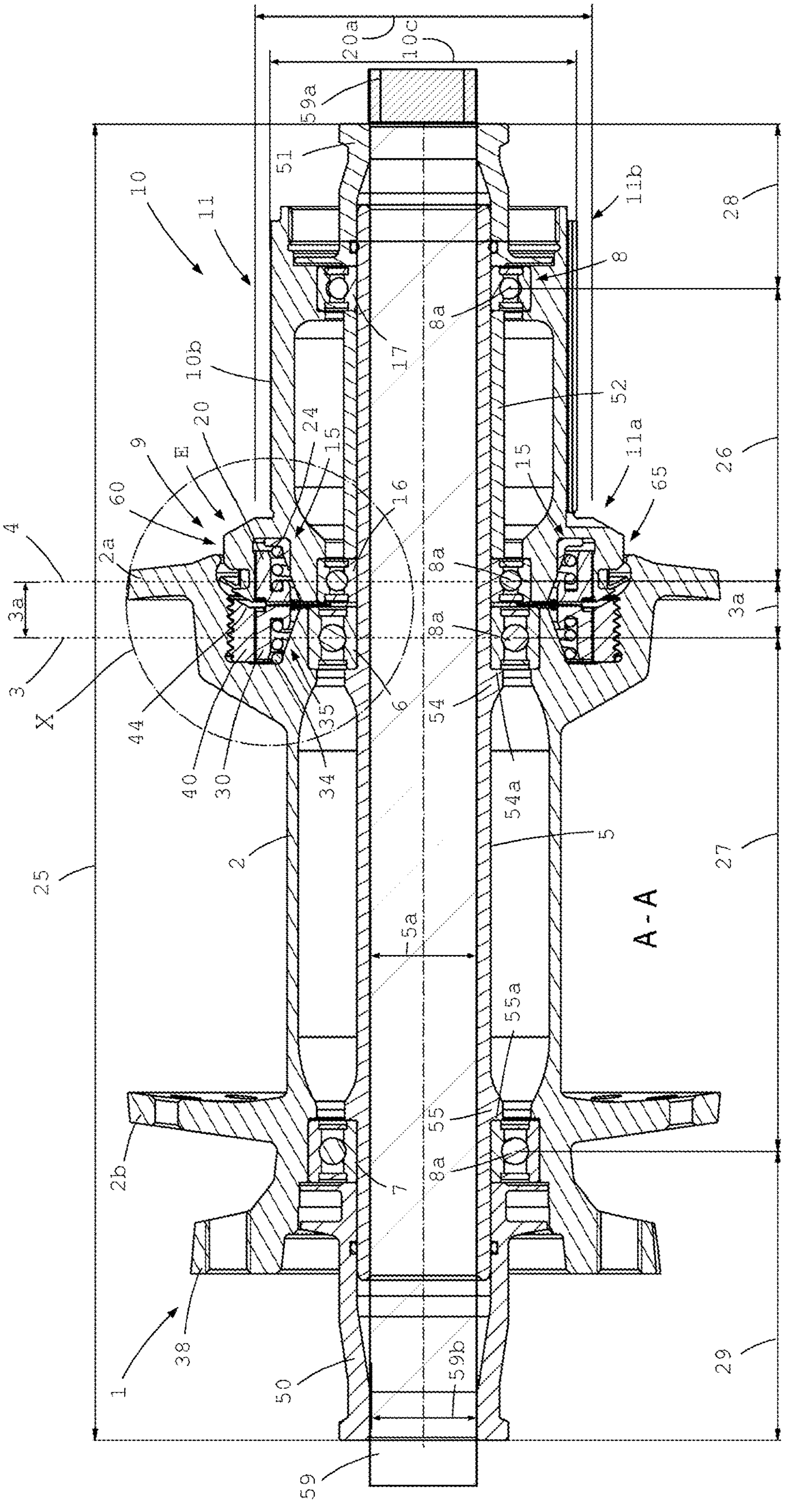
FIG. 5 a cross section A-A through the hub according to FIG. 4.

FIG. 5 shows the cross section A-A of FIG. 4. The hub 1 presently has a fitted length 25 of 148 mm. The hub 1 comprises the hollow hub axle 5, on which the hub shell 2 is supported for rotation by way of the hub bearings 6 and 7. The rotor 10 is presently supported for rotation immediately on the hub axle 5, likewise by way of the roller bearings 16 and 17.

On the hub axle 5, closer to the rotor 10, a bulge 54 with a radial shoulder 54*a* is configured, and at the outer end beneath the hub flange 2*b*, a bulge 55 with a radial shoulder 55*a* is configured. The rotor-side hub bearing 6 rests against the radial shoulder 54*a*, and the outer hub bearing 7 disposed at the other end of the hub shell 2 rests against the shoulder 55*a* of the hub axle 5. Axially outwardly, the limit stop 50 follows the outer hub bearing 7, which is presently pushed onto the hub axle 5, and seals the hub shell to the outside by means of a double flange protruding outwardly.

Toward the rotor 10, the rotor-side hub bearing 6 is followed by a (thin, and presently disk-shaped) spacer 53 (FIG. 6) and thereafter, by the hub-side rotor bearing 16. Between the hub-side rotor bearing 16 and the outer rotor bearing 17, a sleeve 52 acting as a spacer is pushed onto the hub axle 5. Axially outwardly, the limit stop 51 follows the outer rotor bearing 17. The hub 1 is fixedly clamped into the frame.

The hollow hub axle 5 shows an inner clear diameter 5*a* which, depending on the configuration, may be 12 mm, 15 mm, or 16 mm or 17 mm or more. A clamping axle 59 of a clamping mechanism 58 can be pushed through the hollow hub axle 5 for attaching the hub 1 to the frame of a bicycle. At one of its ends, the clamping axle 59 may comprise for example an end piece 59*a* with an external thread, with which to screw the clamping axle 59 into a suitable thread on the frame. At the other of its ends, a corresponding clamping mechanism may be provided, to reliably accommodate and clamp the hub 1 to a frame.

The outer diameter 59*b* of the clamping axle 59 and the inner diameter 5*a* of the hollow hub axle 5 are matched to one another such that on the one hand, a (relatively) unimpeded passage of the clamping axle through the hollow hub axle 5 is enabled, while on the other hand, the hollow hub axle 5 can also be supported on the clamping axle 59 in operation, if the loads applied result in local deflection. In this way, the stability of the hub 1 on the whole is increased.

Alternately it is also possible to omit this additional support. Then, a clamping axle 59 is employed, showing a noticeable radial distance between the hub axle 5 and the clamping axle 59 over large parts of the hub axle 5, to not at all, or to a very minor extent, affect the insertion or removal of the clamping axle.

According to the application, the hub bearings 6 and 7 and also the rotor bearings 16 and 17 are each configured as roller bearings 8, each comprising a plurality of rolling members 8. In this exemplary embodiment, all the roller bearings are configured as deep-groove ball bearings.

The hub 1 is fixedly clamped into the frame in the axial direction. Then, the force flow runs for example from what is the left end in FIG. 5, through the limit stop 50, the inner bearing ring of the outer hub bearing 7, and over the shoulder 55*a* of the bulge 55 into the hollow hub axle 5. From there, the introduced force is guided over the shoulder 54*a* of the bulge 54 into the inner bearing ring of the hub bearing 6 and through the spacer 53 between the rotor-side hub bearing and the hub-side rotor bearing 16. From there, the force enters into the inner bearing ring of the hub-side rotor bearing 16 and is guided over the sleeve 52 to the inner bearing ring of the outer rotor bearing 17 and from there through the limit stop 51, back into the frame. The hub shell 2 and the rotor 10 are radially and axially retained by way of the deep-groove ball bearings.

On the rotor side, the hub shell 2 has a hub flange 2*a*, and on the other side, a hub flange 2*b*. The spokes can be attached to the hub flanges 2*a*, 2*b*. Opposite the rotor 10, the other, outer hub end is provided with the brake disk accommodation 38.

Radially within the rotor-side hub flange 2*a*, a threaded ring 40 is screwed into the hub shell, comprising an inner radial toothing 43 in which the hub-side toothed disk device 30 is inserted. On the hub-side end of the rotor 10, radially within the end portion 60, the rotor-side toothed disk device 20 of the freewheel device 9 is inserted. The end portion 60 extends from the hub-side end 60*a* on the hub-side end face 10*a* axially outwardly, through to the other, outer end 60*b*.

Both the rotor-side toothed disk device 20 and the hub-side toothed disk device 30 comprise an outer radial toothing 23, 33 each, meshing with corresponding inner radial toothings 43 in the threaded ring 40 and in the interior of the end portion 60. Thus, the rotor-side toothed disk device 20 and the hub-side toothed disk device 30 are non-rotatably coupled with the rotor 10 respectively the hub shell 2.

Figure 11A:
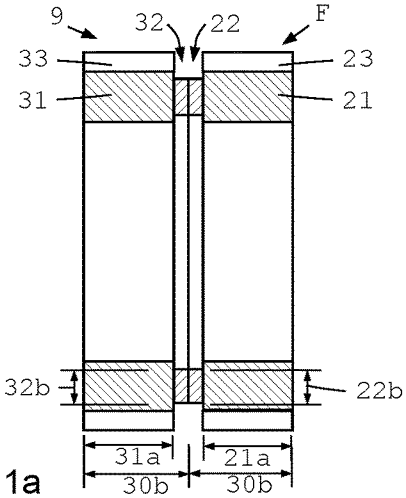
FIGS. 11*a, b* schematic views of a freewheel device and the toothed disk device for a hub according to the application.

At the same time, both of the toothed disk devices 20, 30 can each be moved in the axial direction between an engagement position E (FIG. 5) and a freewheel position F (FIG. 11*a*). Due to the end toothing respectively helical toothing, the oblique tooth faces of the end toothing slip off each other during backpedaling, urging the toothed disk devices 20, 30 apart in the axial direction. When driving force is applied, the end toothings re-engage with one another.

The toothed disk device 20 is biased by way of the biasing device 24, presently in the shape of a cylindrical coil spring, in the engagement position E illustrated. Correspondingly, the toothed disk device 30 is axially biased in the engagement position E, by way of a biasing device or pre-tensioning device 34, which is presently again configured as a cylindrical coil spring. Presently, this means that the hub-side toothed disk device 30 is biased in the direction toward the rotor, while the rotor-side toothed disk device 20 is biased in the direction toward the hub shell 2, by means of the biasing device or pre-tensioning device 24. The action of the biasing device can be effected by means of mechanical springs, or magnetic springs, or pneumatically.

The rotor 10 comprises a rotor body 11, extending from the hub-side end 11*a* to the opposite, outer end 11*b*. On the outer surface of the rotor body 11 the sprocket accommodation 10*b* is provided. This is where a sprocket or several sprockets, or a sprocket cluster can be attached.

On the hub-side end 11*a*, the end portion 60 having an enlarged diameter is configured. Inside of the end portion 60 the rotor-side toothed disk device 20 is accommodated, which comprises an outer diameter 20*a* which is larger than the outer diameter 10*c* of the sprocket accommodation 10*b* of the rotor body 11. The outer diameter 30*a* corresponds to the outer diameter 20*a*. The axial widths 20*b* and 30*b* are likewise identical.

As can be clearly seen in FIG. 5, the planes of rolling member respectively planes of cross section 3, 4 extending transversely to an axis defined by the axle each also intersect the toothed disk devices 20, 30 (through the rolling members 8*a* of the rotor-side hub bearing 6 and the hub-side rotor bearing 16). It can be seen that the plane of rolling member respectively plane of cross section 4 runs through the hub-side rotor bearing 16, the biasing device 24, and the radial toothing of the rotor-side toothed disk device 20, and through the hub flange 2*a* of the hub shell. Furthermore, a sealing unit 68 disposed radially outwardly on the end portion 60 is intersected by the plane of cross section respectively plane of rolling member 4.

Such a configuration, in which the planes of cross section respectively planes of rolling member 3 and 4 intersect the engaging portions of the radial toothings of the two toothed disk devices and each of the assigned roller bearings 6, 16, offers an optimal transfer of the loads occurring in operation. The distance 26 of the two rotor bearings 16, 17 may be selected very large, since the rotor-side toothed disk device 20 is disposed radially outwardly of the hub-side rotor bearing 16, surrounding it radially. The distance 27 of the two hub bearings 6, 7 may likewise be selected very large, since the hub-side toothed disk device 30 is also disposed radially outwardly of the rotor-side hub bearing 6, surrounding it radially.

The clear inner diameters 20*c*, 30*c* of the two toothed disk devices are (considerably) larger than the outer diameters of the pertaining roller bearings 6, 16. The clear inner diameters 20*c*, 30*c* (see FIG. 6) are considerably larger, since on the outer diameters 6*b*, 16*b*, the roller bearings 6, 16 each support an inner wall 18, 36 of the rotor 10 respectively the hub shell 2, which extend toward one another finger-like beneath the accommodations 15, 35.

The accommodation 15, in which the rotor-side toothed disk device 20 is non-rotatably received, is configured radially outside of the inner wall 18 at the rotor. The accommodation 35, in which the hub-side toothed disk device 30 is non-rotatably received on the threaded ring 40, is configured radially outside of the inner wall 36 in the hub shell.

When the mounting width 25 is for example 148 mm, this structural design allows a distance 27 of the two hub bearings between 55 mm and 60 mm, and presently specifically for example 57 mm. The distance 3*a* of the two planes of cross section 3, 4 may be very narrow, and may presently be for example 7 mm, 8 mm or 9 mm. The distance 26 of the two rotor bearings 16, 17 may be between 27 mm and 35 mm, and presently it is for example 32 mm. The distance 28 may be 18 mm, and the distance 29 may be 33 mm.

Figure 6:
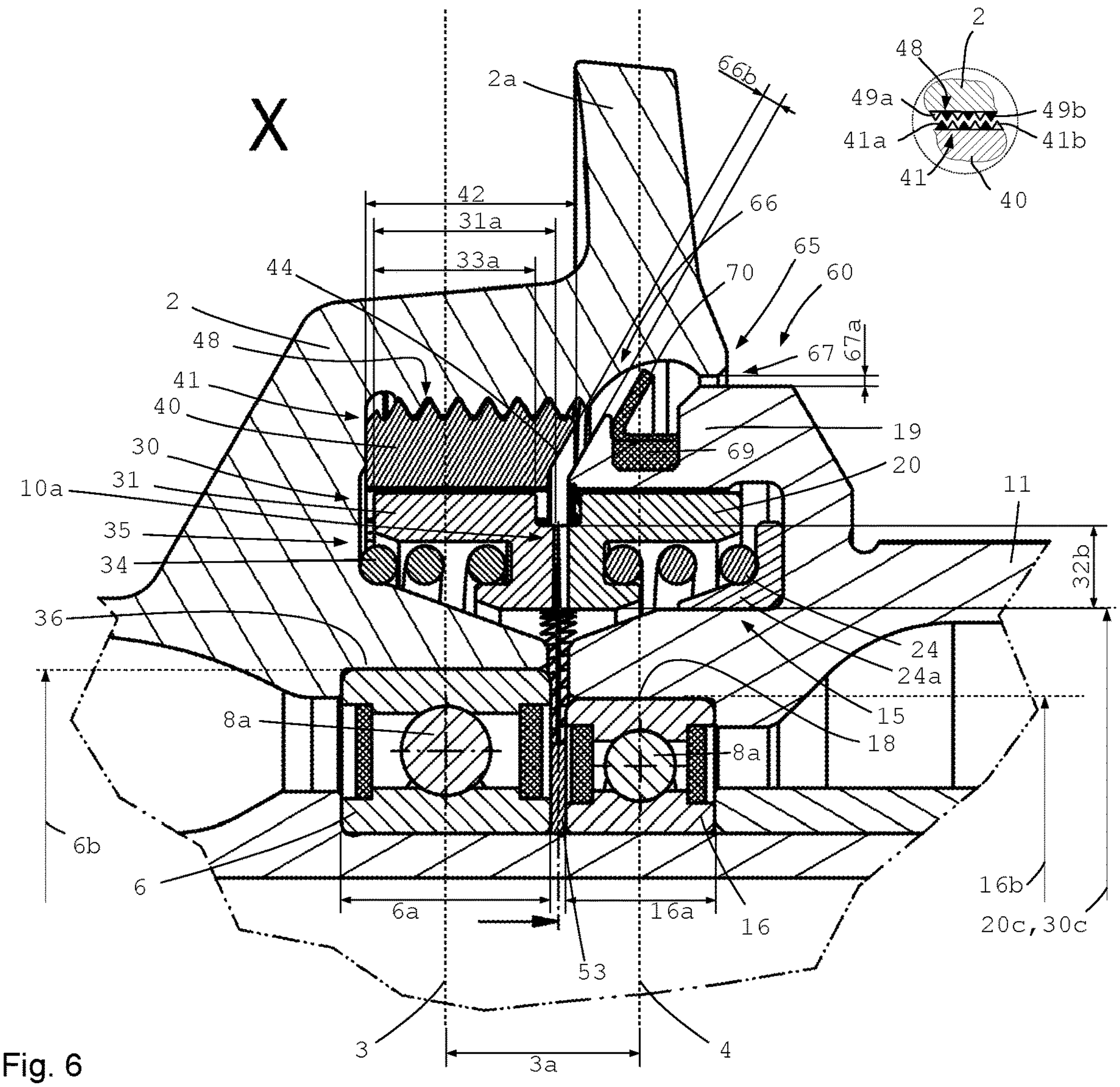
FIG. 6 an enlarged detail "X" from FIG. 5.

FIG. 6 shows the enlarged detail X from FIG. 5. On the hub axle 5 one can recognize the rotor-side hub bearing 6 having a width 6*a* and its hub-side rotor bearing 16 having a width 16*a*, between which a thin spacer 53 can be seen. The spacer 53 decouples from one another the two outer bearing rings of the bearings 6, 16. The width of the spacer 53 is narrower than half or a quarter or an eighth of the axial width 16*a* of the hub-side rotor bearing 16.

The rotor-side hub bearing 6 supports a wall 36 of the hub shell 2, which extends finger-like and, in particular, wedge-like or tapered toward the rotor 10, surrounding the rotor-side hub bearing 6 radially outwardly. The hub shell 2 is supported by the wall 36. The accommodation 35 is configured radially around, accommodating the hub-side toothed disk device 30. The hub-side toothed disk device 30 is biased by the biasing device 34 in the engagement position E.

The toothed disk device 30 comprises an outer radial toothing 33 (see FIG. 11*b*), which meshes with an inner radial toothing 43 (see FIG. 12*a*) in the threaded ring 40. The threaded ring 40 is screwed into the internal thread 48 in the hub shell 2 by way of the external thread 41.

On the hub-side end face 10 of the rotor 10, an accommodation 15 is configured in which the rotor-side toothed disk device 20 is accommodated. The rotor-side toothed disk device 20 comprises an end toothing 22 oriented to the hub shell. The end toothing 22 meshes with the end toothing 32 on the hub-side toothed disk device 30. The toothed disk devices 20, 30 are each axially urged to one another by means of the biasing devices 24, 34.

The holder respectively insert 24*a*, in the accommodation 15 on the hub-side end face 10 of the rotor 10, enables the use of identical toothed disk devices 20, 30, to provide for ease of installation, since confusion can be excluded. In terms of manufacturing technique, the accommodation 15 must be configured enlarged, to allow manufacture of the inner radial toothing 13 in the end portion 60 of the rotor 10. The conditions in the accommodations 15, 35 are identical.

The axial width 33*a* of the radial toothing 33 of the hub-side toothed disk device 30 and the (preferably) identical axial width 23*a* of the radial toothing 23 of the rotor-side toothed disk device 20, may, in particular, be larger than the axial width 16*a* or the axial width 6*a* of the roller bearing 6 respectively 16.

Figure 12A:
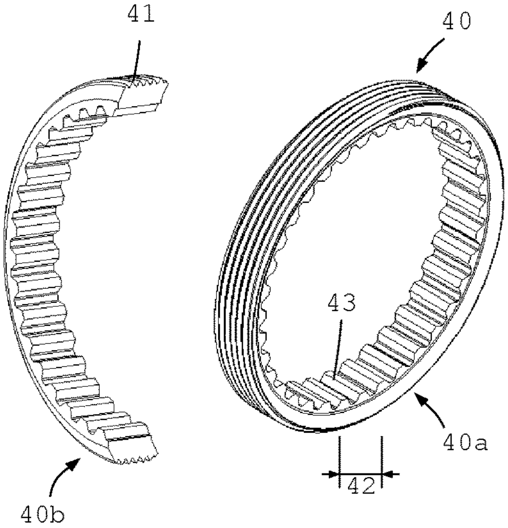
FIGS. 12*a-c* a schematic perspective view and schematic cross sections of a threaded ring for a hub according to the application.
Figure 12B:
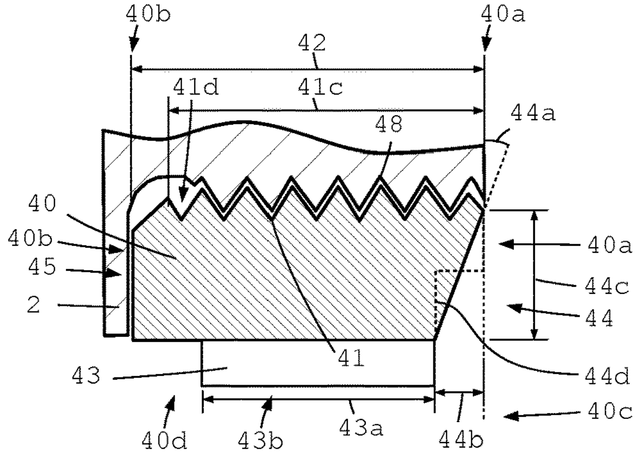

The axial width 42 of the threaded ring 40 is larger on the radial outside, since on the rotor side, the threaded ring has a central depression 44, which is presently configured as a conical depression respectively chamfer 44 (see FIG. 12*b*). This enlarges the thread length of the external thread 41, thus increasing the stability.

The engagement body 21, 31 of the rotor-side toothed disk device 20 and the hub-side toothed disk device 30 each comprise a radial toothing 23, 33 over an axial length 23*a* respectively 33*a*, which is clearly larger than the radial height 22*b* respectively 32*b* of the end toothing 22 respectively 32. This provides a precise guide for the two toothed disk devices in the axial direction. The axial length 21*a*, 31*a* of the engagement bodies 21, 31 is larger by the axial width of the end toothings.

The threaded ring 40 may be screw-connected with the hub shell 2 by means of a multiple thread. FIG. 6 shows on the top right an optional configuration, wherein two continuous and separate thread grooves 41*a* and 41*b* are screw-connected with corresponding thread grooves 49*a* and 49*b* in the hub shell 2.

The sealing device 65 for sealing the freewheel device 9 against environmental influences comprises a nearly horizontally configured (outer) narrow sealing gap 67 having a low radial height respectively clear dimension 67*a* of less than 0.5 mm. The outer sealing gap 67 extends between an enlarged diameter area 63 at the end portion 60 and a radially inwardly protruding wall 46 at the hub shell 2.

From there axially inwardly, a groove 62 is configured radially outside on the end portion 60, which accommodates a sealing unit 68 with a ring portion 69. An elastic sealing lip extends from the ring portion 69 obliquely outwardly out of the groove 62, so that a V-shaped cross section results between the ring portion 69 and the elastic sealing lip 70, which is opened axially outwardly toward the outer sealing gap 67. The sealing lip 70 protrudes into a peripheral groove 47 (see FIG. 8).

Axially further inwardly, a conical gap 66*a* respectively cone gap follows, having a clear gap width 66*b*. Overall, the sealing device 65 therefore comprises three sealing gaps, firstly the cone gap 66*a*, then the gap between the elastic sealing lip 70 and the wall of the sealing groove 47 in the hub shell, and the outer sealing gap 67 between the outer wall 19 in the enlarged diameter area 63 on the end portion 60 of the rotor 10.

FIG. 6 once again clearly shows that the plane of cross section 4 extends through the rolling members 8*a* of the hub-side rotor bearing 16, through the radial toothing 23, and through the sealing unit 68, and the rotor-side hub flange 2*a*. The hub-side rotor bearing 16 supports the inner radial wall 18 of the rotor body 11. On the radial outside thereof, the accommodation 15 is disposed in which the rotor-side toothed disk device 20 is non-rotatably accommodated, coupled with the rotor 10.

The simple structure reliably prevents errors in installation.

Figure 7:
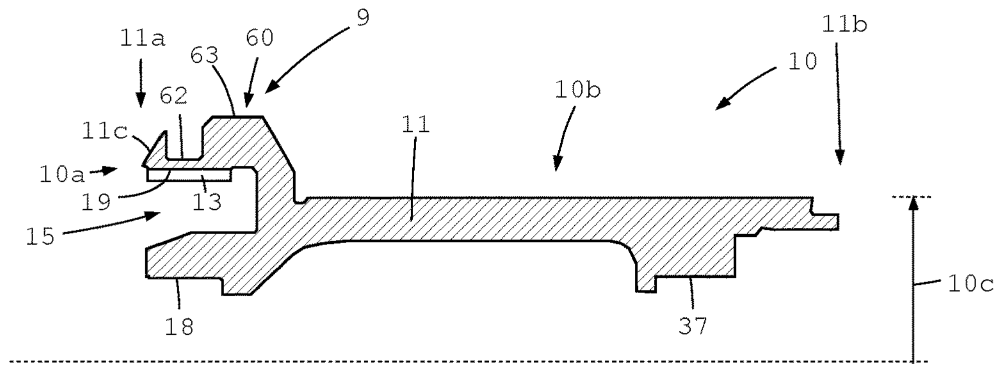
FIG. 7 a schematic, cross sectional view of the rotor of the hub according to FIG. 5.

FIG. 7 shows a schematic cross section through the rotor body 11 of the rotor 10, which extends from the hub-side end 11*a* toward the outer end 11*b*. On the outer surface of the rotor body 11, the sprocket accommodation 10*b* is provided, showing an outer diameter 10*c* which is smaller than the diameter of the inner radial toothings 13 on the accommodation 15 for the rotor-side toothed disk device 20.

The enlarged diameter area 63, which provides a wall of the sealing gap 67, is located on the end portion 60. The sealing unit 68 can be disposed in the peripheral groove 62. On the hub-side end 11*a*, the conical portion 11*c* is configured, forming, together with the conical depression 44 on the threaded ring 40, the inner sealing gap 66 respectively cone gap 66*a*. On the radial inside, the inner radial wall 18 can be seen, against which the rotor 10 is supported on the hub-side rotor bearing 16.

Figure 8:
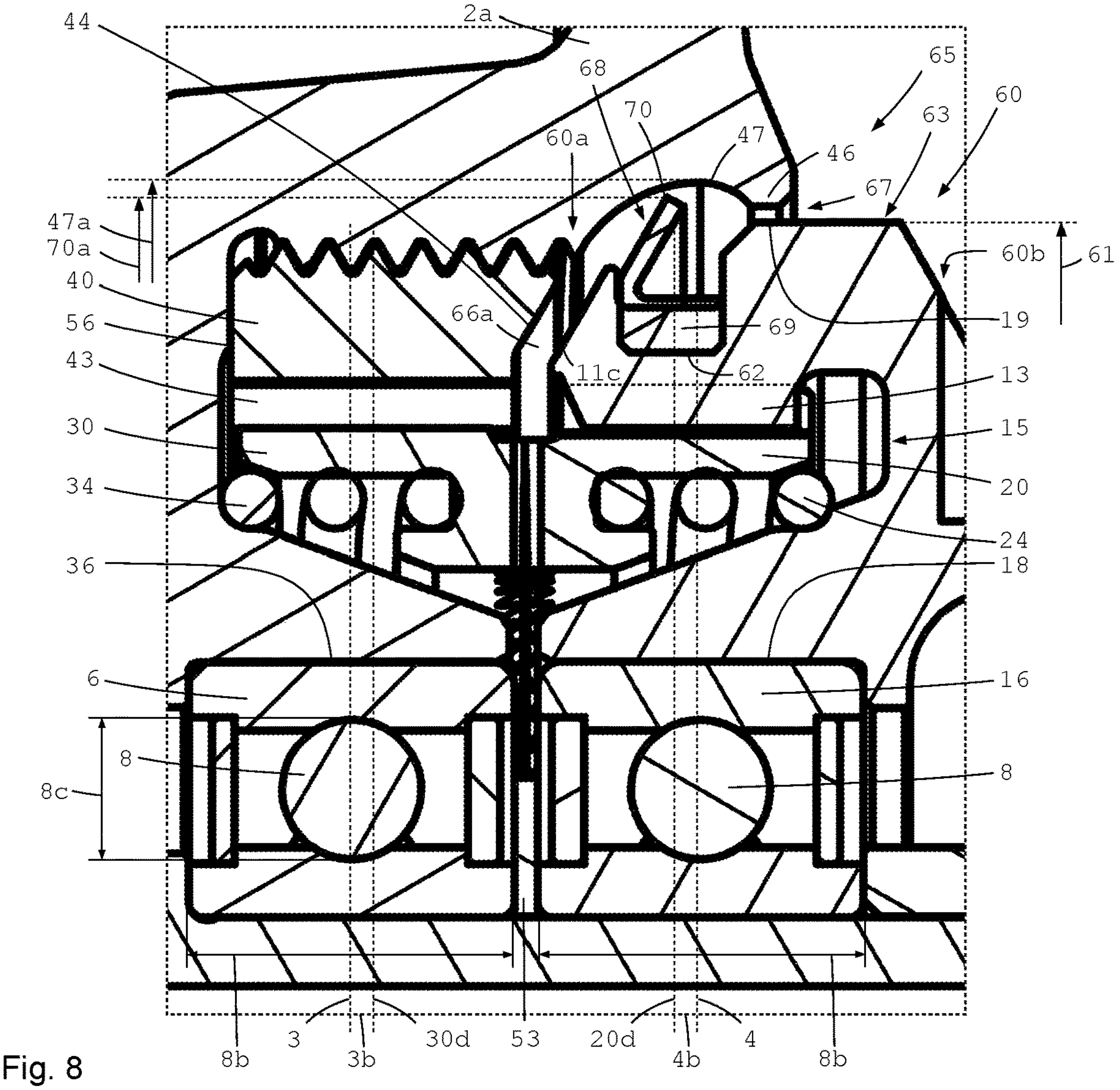
FIG. 8 an enlarged detail of a variant of a hub according to the application.

FIG. 8 shows an enlarged detail of a variant of FIG. 6, wherein, unlike the configuration according to FIG. 5, identically sized roller bearings 6, 16 (with identical widths 8*b*) are used as the hub-side rotor bearing 16 and the rotor-side hub bearing 6. This further facilitates installation and storage, since the quantity of different parts is further reduced. Again, the rotor-side toothed disk device 20 is accommodated in the accommodation 15 of the rotor body 11. The inner radial toothing 13 on the outer wall 19 guides the radial toothing 23 of the rotor-side toothed disk device 20 in the axial direction. The biasing device 24 urges the end toothing 22 in the direction toward the hub shell.

The outer diameter 70*a* of the elastic sealing lip 70 is larger than the outer diameter 61 of the outer sealing gap 67. This results in that water penetrating axially through the sealing gap 67 causes deformation of the sealing lip 70, so that it rests (more forcefully) against the wall of the sealing groove 47, obtaining a still higher sealing effect.

The central plane of cross section 20*d* (central plane of toothed disk) through the radial toothing 23 of the rotor-side toothed disk is only distant by a slight distance 4*b* from the plane of cross section 4 (plane of rolling member) through the rolling members 8*a* of the hub-side rotor bearing 16. The distance 4*b* between the planes of cross section 20*d* and 4 is, in particular, less than half the diameter respectively the radius of a rolling member 8, and particularly preferably it is also less than the smallest wall thickness of the hollow hub axle 5. This applies accordingly for the central plane of cross section 30*d* through the axial center of the radial toothing of the rotor-side toothed disk device 30. Again, the distance 3*b* between the two planes of cross section 3 (plane of rolling member) and 30*d* (central plane of toothed disk) is very small and, in particular, smaller than half the diameter or half the radius of a rolling member 8*a* of the rotor-side hub bearing 6.

The central plane of cross section 20*d* through the radial toothing 23 intersects the rolling members 8*a* of the hub-side rotor bearing 16. The central plane of cross section 30*d* through the radial toothing 33 also intersects the rolling members 8*a* of the rotor-side hub bearing 6. This effectively allows transferring the highest forces. The distances 3*b* and 4*b* are very small and smaller than half the diameter 8*c* or even half the radius of the rolling members 8*a*.

Figure 9:
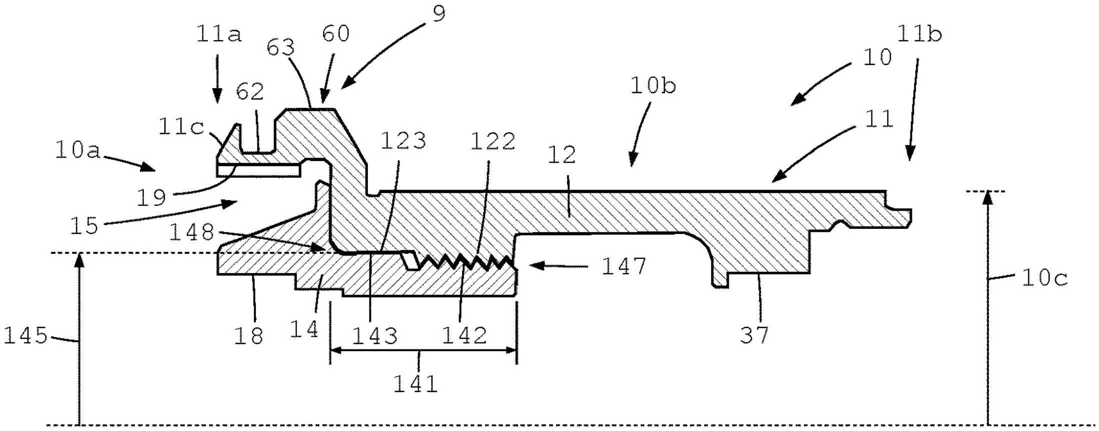
FIG. 9 a schematic, cross sectional view of a two-piece rotor for a hub according to the application.

FIG. 9 shows a modification of the rotor 10, presently consisting of two rotor parts 12 and 14. The rotor body 11 comprises a first rotor part 12, which provides the sprocket accommodation 10*b*. Furthermore the wall 37 is configured on the first rotor part 12, by means of which wall the rotor 10 is supported on the hub axle 5 by way of the outer rotor bearing 17. The inner radial wall 18 is configured on the second rotor part 14, by means of which wall the rotor 10 is supported on the hub-side rotor bearing 16 for rotation around the hub axle 5.

The second rotor part 14 is screw-connected with the first rotor part 12. To provide aligned guiding and concentric running, which is, in particular, important for the rotor, the first rotor part 12 and the second rotor part 14 each comprise a connecting area 121 (FIG. 10) and a connecting portion 141. The connecting area 121 comprises a threaded area 122 and a guiding area 123. The connecting portion 141 comprises a threaded portion 142 and a guiding portion 143. The guiding portion 143 has a diameter 145.

A length 141*a* of the connecting portion 141 of the second rotor part 14, in particular, corresponds to at least ¼ or ⅓ of the length 14*a* of the second rotor part 14, in particular, between a quarter and half of the length of the rotor body 11.

The ratio of the length 143*a* of the guiding portion 143 to the diameter 145 of the guiding portion 143 is higher than 1:10. Preferably, the ratio of the length 143*a* of the guiding portion 143 to the length 141*a* of the connecting portion 141 is higher than 1:4.

In the installed condition, the threaded area 122 and the threaded portion 142 are screw-connected. The required centering is effected by the guiding area 123 and the guiding portion 143. The radial tolerance in the guiding portion 143 is less than the radial tolerance between the threaded area 122 and the threaded portion 142.

Figure 10:
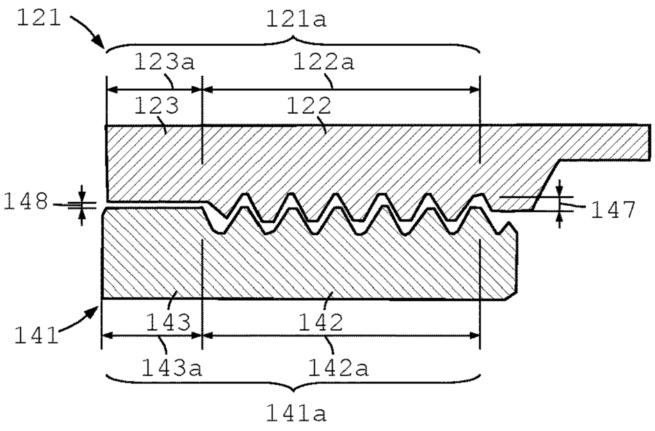
FIG. 10 a schematic detail of the two-piece rotor according to FIG. 9.

FIG. 10 shows the interaction of the connecting area 121 and the connecting portion 141 in an enlarged, schematic illustration. The connecting area 121 extends over a length 121*a*, which is composed of the length 122*a* of the threaded area 122 and the length 123*a* of the guiding area 123.

Accordingly, a connecting portion 141 is configured on the second rotor part 14, extending over a length 141*a*. The connecting portion 141 is composed of the threaded portion 142 and the guiding portion 143, which extend over a length 142*a* respectively 143*a*. The threaded area 122 (respectively the threaded portion 142) has a narrower tolerance 148 than does the screw-connected guiding area 123 (respectively guiding portion 143) having a tolerance 147. This provides high precision and repeatability of the radial orientation of the rotor 10.

Figure 11B:
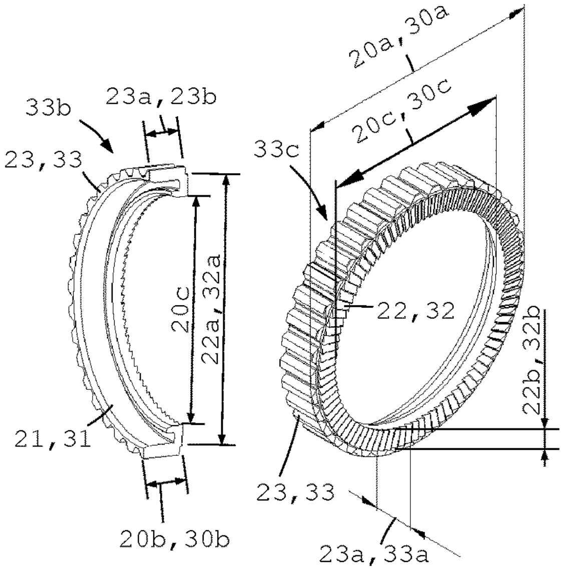

FIGS. 11*a* and 11*b* show the toothed disk devices 20, 30, presently identical, each having an engagement body 21, 31 and an end toothing 22, 32, and an outer radial toothing 23, 33. The outer radial toothings 23, 33 extend in the axial direction over an axial length 23*a*, 33*a*. The axial extension 21*a*, 31*a* of the engagement bodies 21, 31 is, at least by the axial width of the end toothings 22, 32, larger than the axial length 23*a*, 33*a* of the outer radial toothings 23, 33. The clear inner diameter 20*c* is larger than the outer diameter of the roller bearings 6, 16. The outer diameter 22*a*, 32*a* is larger than the outer diameter 10*c* of the sprocket accommodation 10*b*.

The number of teeth of the end toothing is preferably higher than 72, and it may be 90, 100, 110 or 120 or more.

The outer radial toothings 23, 33 of the toothed disk devices 20, 30 and the inner radial toothings 13, 43 preferably have between 20 and 60 radial teeth. In this exemplary embodiment, the toothed disk devices 20, 30 comprise approximately 36 radial teeth.

The radial extension 22*b*, 32*b* of the end toothings 22, 32 is less than the axial length 23*a*, 33*a* of the radial toothings 23, 33.

Figure 12C:
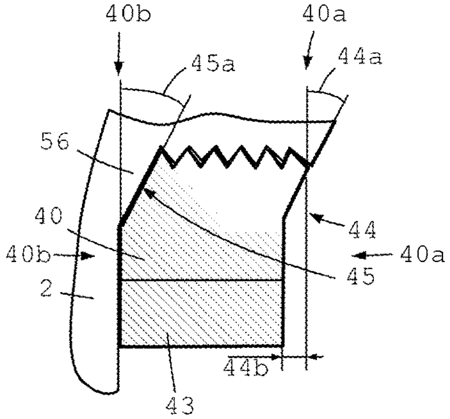

The FIGS. 12*a*, 12*b* and 12*c* show variants of the threaded ring 40, each comprising an axial width 42, and on the outer periphery, comprising a preferably multiple thread, with which to screw the threaded ring into a corresponding thread in the hub shell 2.

At the rotor-side end 40*a* of the threaded ring 40, a central depression 44, presently in the shape of a chamfer respectively conical depression 44, is configured running at an angle 44*a* of for example 30° and comprising a depth 44*b*.

The threaded ring 40, when properly mounted, is screwed into the hub shell 2. The hub-side toothed disk device 30 of the freewheel device 9 is accommodated therein. The end toothing 32 faces in the direction of the rotor 10 and is biased in the engagement position (E) by means of a biasing device 24.

The threaded ring 40 has an outer contour 41*d* with an external thread 41, and comprises a central through hole 40*c* with an inner contour 40*d*. The inner contour 40*d* comprises a non-round inner coupling contour 43*b*, which is non-rotatably coupled in the driving direction with a matching non-round outer coupling contour 33*b* on the outer periphery 33*c* of the hub-side toothed disk device 30. The inner coupling contour 43*b* may extend over the entire length or only part of the length of the inner contour 40*d*.

The threaded ring 40 has a central depression 44 at the rotor-side end 40*a*, so that the external thread 41 on the threaded ring 40 extends in the direction to the rotor 10 axially further outwardly than does the inner coupling contour 43*b*. This widens the external thread 41 of the threaded ring 40 in the direction toward the rotor 10. An improved accommodation of the threaded ring 40 in the hub shell 2 is possible. The strength is improved. The external thread 41 is extended.

Thus, the axial length 41*c* of the external thread 41 is larger than the axial length 33*a* of the coupling structure, which comprises the inner coupling contour 43*b* and the outer coupling contour 33*b*. The threaded ring 40 is screwed into the internal thread 48 of the hub shell 2 by means of the external thread 41.

The hub-side toothed disk device 30 is accommodated radially within the threaded ring 40 by way of the coupling structure 33*b*, 43*b*, non-rotatably in the driving direction and axially movable. At the rotor-side end 40*a*, the threaded ring 40 has a central, and presently centered, depression 44. The axial width 41*c* of the external thread 41 is wider than the axial width 33*a* of the coupling structure.

In the variant according to FIG. 12*b*, the central depression 44 is configured as a conical depression. In all the exemplary embodiments, the depression 44 has an axial depth 44*b* of at least 5% (and, in particular, at least 10%) of the axial width 42 of the threaded ring 40. The axial length 41*c* of the outer contour 41*d* of the threaded ring 40 is larger than the axial length 43*a* of the inner radial toothing 43 (which is the inner coupling contour 43*b*).

The axial depth 44*b* of the central depression 44 is between 5% and 25% of the axial width 42 of the threaded ring 40, and preferably between 10% and 20% of the axial width 42 of the threaded ring 40. The axial depth 44*b* of the central depression 44 is preferably between 0.5 mm and 3 mm.

In all the configurations, the central depression 44 may be stepped and for example configured as a stepped depression 44*d*, as is for example indicated in broken lines in FIG. 12*b*. Also possible is, a stepped and conical configuration. Preferably, the central depression 44 is configured conical or convex as a centric chamfer. An angle or cone angle 44*a* of the (conical) depression 44 to a plane transverse to the axis of symmetry of the hub or hub axle is, in particular, between 5° and 30°.

In the exemplary embodiment, the inner coupling contour 43*b* comprises, or is configured as, an inner radial toothing 43 on the threaded ring 40. The outer coupling contour 33*b* on the hub-side toothed disk device 30 comprises, or is configured as, an outer radial toothing 33. In the mounted condition, a conical portion 11*c* configured on the end face 10*a* of the rotor 10, plunges contactless into the central depression 44 on the threaded ring 40. A sealing gap is configured in-between.

At the other end 40*b*, a conical support portion 45 may be configured (see FIG. 12*c*), extending at the conical angle 45*a* (for example) 30°. Such a conical support portion 45 allows saving axial mounting space. Alternately it is possible to configure the support portion 45 perpendicular to the axis of symmetry. This facilitates manufacture.

Overall, an advantageous hub 1 which is simple in structure is provided. The hub 1 is easy to assemble and comprises a relatively small number of parts. High stability is achieved. A high number of teeth of the end toothing can provide a very narrow engagement angle.

The configuration of the rotor-side toothed disk device 20 in the accommodation 15 in the rotor provides a compact hub 1, in which the rotor-side toothed disk device 20 is guided in the inner radial toothing 13 of the rotor. This provides a high quality, axial guiding. The large diameter of the radial toothing and thus of the axial guide prevents tilting and jamming and provides for a reliable function.

While a particular embodiment of the present hub, in particular for bicycles have been described herein, it will be appreciated by those skilled in the art that changes and modifications may be made thereto without departing from the invention in its broader aspects and as set forth in the following claims.

List of reference numerals:

| | | | |
|---|---|---|---|
| 1 | hub | 143a | length of 143 |
| 2 | hub shell | 210a | diameter of 143 |
| 2a | hub flange | 147 | tolerance of 142/122 |
| 2b | hub flange | 148 | tolerance of 143/123 |
| 3 | plane of cross section, | 15 | accommodation |
| | plane of rolling member | 16 | hub-side rotor bearing |
| 3a | distance of 3, 4 | 16a | axial width |
| 3b | distance 3, 30d | 16b | external diameter |
| 4 | plane of cross section, | 17 | outer rotor bearing |
| | plane of rolling member | 18 | inner radial wall |
| 4b | distance 4, 20d | 19 | outer wall |
| 5 | hub axle | 20 | rotor-side toothed disk |
| 5a | through hole | | device |
| 6 | rotor-side hub bearing | 20a | external diameter |
| 6a | axial width | 20b | axial width |
| 6b | external diameter | 20c | clear inner diameter |
| 7 | outer hub bearing | 20d | central plane of cross |
| 8 | roller bearing | | section |
| 8a | rolling member | 21 | engagement body |
| 8b | axial width | 21a | axial extension |
| 8c | diameter 8a | 22 | end toothing |

-continued

List of reference numerals:

| | | | |
|---|---|---|---|
| 9 | freewheel device | 22a | external diameter |
| 10 | rotor | 22b | radial height |
| 10a | hub-side end face | 23 | radial toothing |
| 10b | sprocket accommodation | 23a | axial length |
| 10c | outer diameter 10b | 24 | biasing device |
| 11 | rotor body | 24a | holder |
| 11a | hub-side end | 25 | fitted length |
| 11b | outer end | 26, 27 | bearing distance |
| 11c | conical portion | 28 | distance |
| 12 | first rotor part | 29 | distance |
| 121 | connecting area | 30 | hub-side toothed disk |
| 121a | length of 121 | | device |
| 122 | threaded area | 30a | external diameter |
| 122a | length of 122 | 30b | axial width |
| 123 | guiding area | 30c | clear inner diameter |
| 123a | length of 123 | 30d | central plane of cross |
| 13 | inner radial toothing | | section |
| 14 | second rotor part | 31 | engagement body |
| 141 | connecting portion | 31a | axial extension |
| 141a | length of 141 | 32 | end toothing |
| 142 | threaded portion | 32b | radial height |
| 142a | length of 142 | 33 | radial toothing |
| 143 | guiding portion | 33a | axial length |
| 33b | outer coupling contour | 59 | clamping axle |
| 33c | outer periphery | 59a | end piece |
| 34 | biasing device | 59b | diameter |
| 35 | accommodation | 60 | end portion |
| 36 | inner wall | 60a | hub-side end (60) |
| 37 | wall | 60b | other end of 60 |
| 38 | brake disk | 61 | diameter |
| | accommodation | 62 | groove |
| 40 | threaded ring | 63 | enlarged diameter area |
| 40a | rotor-side end, axially | 65 | sealing device |
| | outer surface | 66 | inner sealing gap |
| 40b | hub-side end, axially | 66a | cone gap |
| | inner surface | 66b | clear gap width |
| 40c | central through hole | 67 | outer sealing gap |
| 40d | inner contour of 40 | 67a | clear dimension |
| 41 | external thread | 68 | sealing unit |
| 41a, b | thread groove | 69 | ring portion |
| 41c | axial length | 70 | sealing lip/elastic |
| 41d | outer contour | | wall |
| 42 | axial width | 70a | external diameter |
| 43 | inner radial toothing | 100 | bicycle |
| 43a | axial length | 101 | wheel, front wheel |
| 43b | inner coupling contour | 102 | wheel, rear wheel |
| 44 | central depression, | 103 | frame |
| | conical depression | 104 | fork, suspension fork |
| 44a | angle | 105 | rear wheel damper |
| 44b | depth | 106 | handlebar |
| 44c | height | 107 | saddle |
| 44d | stepped depression | 109 | spoke |
| 45 | (conical) support | 110 | rim |
| | portion | 111 | sprocket assembly |
| 45a | angle | 112 | pedal crank |
| 46 | sealing wall | F | freewheeling position |
| 47 | sealing groove | E | engagement position |
| 47a | diameter | | |
| 48 | thread in 2 | | |
| 49a, b | thread groove | | |
| 50, 51 | limit stop | | |
| 52 | sleeve body | | |
| 53 | spacer | | |
| 54, 55 | radial bulges | | |
| 54a | shoulder | | |
| 55a | shoulder | | |
| 56 | accommodating contour | | |
| | (conical) | | |
| 58 | clamping mechanism | | |

The invention claimed is:

1. A hub for at least partially muscle-powered vehicles, comprising:

a hub axle; a hub shell; a rotor with a rotor body; and a freewheel device with two toothed disk devices, one hub-side toothed disk device coupled to the hub shell, and one rotor-side toothed disk device interacting therewith and coupled to the rotor body, to couple the rotor to the hub shell in a rotationally fixed manner in the driving direction, and to decouple them from one another in a freewheeling position;

wherein each of the toothed disk devices comprises an end toothing for engagement with one another, and is biased by means of at least one biasing device to an engagement position;

wherein at least one sprocket accommodation for at least one sprocket device is configured outwardly on the rotor body; and wherein the rotor body comprises on the hub-side end, an inner radial wall to radially support a hub-side rotor bearing;

on an end face at the hub-side end of the rotor, radially between the inner radial wall and an outer wall of the rotor, a circumferential accommodation accessible from the end face is configured, in which the rotor-side toothed disk device is accommodated in a rotationally fixed manner in the driving direction and axially movable.

2. The hub according to claim 1, wherein the hub-side toothed disk device is accommodated radially within the hub shell, and the end toothing is oriented to the rotor, and wherein the rotor-side toothed disk device is accommodated radially within the rotor, and the end toothing is oriented to the hub shell, and wherein at least half the axial width of the rotor-side toothed disk device is accommodated radially within the hub shell.

3. The hub according to claim 1, wherein the hub-side toothed disk device is radially outwardly coupled to the hub through a threaded ring, and the rotor-side toothed disk device is radially outwardly coupled to the rotor, in a rotationally fixed manner in the driving direction;

and wherein the rotor-side toothed disk device comprises an outer radial toothing, which is engaged with an inner radial toothing in the rotor and is axially movable.

4. The hub according to claim 1, wherein the outer diameter of the sprocket accommodation is smaller than the outer diameter of the rotor-side toothed disk device and smaller than the outer diameter of the end toothing of the rotor-side toothed disk device.

5. The hub according to claim 1, wherein the hub-side toothed disk device comprises an outer radial toothing, which is engaged with an inner radial toothing in the hub shell and is axially movable, and wherein the inner radial toothing is configured on a threaded ring screwed into the hub shell.

6. The hub according to claim 5, wherein the threaded ring on the outer axial surface has a conical depression, into which a conical portion configured on the hub-side end face of the rotor plunges contactless.

7. The hub according to claim 5, wherein the threaded ring has a support portion on the axially inner surface facing away from the rotor, in which the support portion bears against a correspondingly configured accommodating contour in the hub shell.

8. The hub according to claim 5, wherein the external thread of the threaded ring extends axially outwardly beyond the hub-side toothed disk device up to radially beyond the rotor-side toothed disk device, which it partially overlaps.

9. The hub according to claim 1, wherein at least one toothed disk device of the two toothed disk devices comprises an engagement body, on which the end toothing and the outer radial toothing are configured;

and wherein the engagement body comprises an axial extension, which has an axial length that is larger than the axial width of a roller bearing, and is larger than the axial width of the hub-side rotor bearing;

and wherein the engagement body axial extension, has a height which is larger than a radial height of the end toothing.

10. The hub according to claim 1, wherein the rotor is supported for rotation with two axially spaced apart rotor bearings on the hub axle, the hub-side rotor bearing disposed closer to the hub shell, and an outer rotor bearing further distant from the hub shell, and wherein the hub shell is supported for rotation with two axially spaced apart hub bearings on the hub axle, a rotor-side hub bearing disposed closer to the rotor and an outer hub bearing further distant from the rotor;

and wherein the rotor body comprises a hub-side end and an opposite, outer end, and wherein the rotor body on the hub-side end comprises an end portion with an enlarged diameter, on which the rotor-side toothed disk device is accommodated, wherein the end portion extends from a hub-side end of the end portion to another end.

11. The hub according to claim 6, wherein a sealing device is configured between the hub shell and the rotor, having an axially inner sealing gap between the hub shell and the rotor, and axially further outwardly from the inner sealing gap and nearer to the rotor, an outer sealing gap, and axially in-between said inner sealing gap and said outer sealing gap, a sealing unit with a sealing lip;

and wherein the axially inner sealing gap is configured by a cone gap between the conical portion on the rotor and the conical depression in the threaded ring, and has a clear gap width smaller than 1.5 mm;

and wherein the end portion of the rotor on an outer periphery comprises a circumferential groove, in which the sealing unit is disposed, wherein the sealing unit comprises a ring portion in the groove and an elastic sealing lip protruding from the ring portion obliquely outwardly, wherein in a mounted condition, the ring portion and the elastic sealing lip show a V-shape open toward an axially outer end.

12. The hub according to claim 11, wherein the conical portion is configured on the hub-side end of the end portion of the rotor, and wherein a further enlarged diameter area is configured on the other end of the end portion;

and wherein the outer sealing gap is configured between the enlarged diameter area and a sealing wall on the rotor-side end of the hub shell between the rotor and the hub shell, wherein the sealing gap has a clear dimension of less than 0.5 mm;

and wherein a circumferential sealing groove is configured in the hub shell adjacent to the sealing wall, into which the elastic sealing lip protrudes, and wherein the elastic sealing lip protrudes into the sealing groove and in the case of water penetrating from the outside, bears elastically against the wall of the sealing groove.

13. The hub according to claim 12, wherein along the rotor, traveling towards the hub is considered axially inward, and traveling away from the hub is considered axially outward, a radially largest inner diameter of the sealing groove on the hub shell is larger than what is the largest outer diameter of the elastic sealing lip in the normal state, and wherein the largest inner diameter of the sealing groove is axially further outwardly than the largest outer diameter of the elastic sealing lip, and wherein what is the largest outer diameter of the elastic sealing lip in the normal state, is larger than the diameter of the outer sealing gap between the hub shell and the rotor.

14. A rotor for a hub for at least partially muscle-powered vehicles, comprising a rotor body, extending from an inner, hub-side end toward an outer end, and comprising a rotor-side toothed disk device coupled to the rotor body, to couple the rotor body to a hub shell in a rotationally fixed manner in the driving direction, and to decouple from the hub shell in a freewheeling position (F);

wherein the rotor-side toothed disk device comprises an end toothing for engagement with an end toothing coupled to a hub shell, and wherein the rotor-side toothed disk device is biased to an engagement position (E) by means of at least one biasing device;

wherein at least one sprocket accommodation for at least one sprocket device is configured outwardly on the rotor body, and wherein the rotor body comprises on the hub-side end, an inner radial wall to radially support a hub-side rotor bearing; and on an end face on the hub-side end of the rotor, radially between the inner radial wall and the outer wall, a circumferential accommodation accessible from the end face is configured, in which the rotor-side toothed disk device is accommodated in a rotationally fixed manner in the driving direction and axially movable.

15. The rotor according claim 14, wherein the rotor body comprises at least two rotor bearings, the hub-side rotor bearing and an outer, further distant rotor bearing, and wherein at least one rotor bearing of the at least two rotor bearings is configured to support the rotor body on a hub axle.

16. The rotor according to claim 14, wherein the rotor body comprises on the hub-side end, an end portion with an enlarged diameter, on which the rotor-side toothed disk device is accommodated, wherein an inner radial toothing is configured on the inner periphery of the end portion, in which the rotor-side toothed disk device couples to an outer radial toothing in a rotationally fixed manner in the driving direction.

17. The rotor according to claim 16, wherein the end portion on an outer periphery comprises a circumferential groove with a sealing unit disposed therein, wherein the sealing unit comprises a circumferential ring portion in the groove and an elastic sealing lip protruding from the ring portion obliquely outwardly, and wherein in a mounted condition, the ring portion and the elastic sealing lip show a V-shape open toward the outer end.

18. The rotor according to claim 14, wherein the rotor body comprises two rotor parts, wherein a first rotor part supports the outer rotor bearing, and a second rotor part supports the hub-side rotor bearing, and wherein the second rotor part is screwed into the first rotor part.

19. The rotor according to claim 18, wherein the first rotor part has a connecting area, and wherein the second rotor part comprises a connecting portion, wherein the connecting portion comprises a threaded portion and a guiding portion, and wherein the connecting area comprises a threaded area and a guiding area, and wherein the threaded area is screw-connected to the threaded portion, and wherein the guiding area is centered on the guiding portion, and wherein the radial tolerance between the first rotor part and the second rotor part on the threaded portion is larger than it is on the guiding portion.

* * * * *